United States Patent
Ireland

(10) Patent No.: US 10,726,960 B2
(45) Date of Patent: Jul. 28, 2020

(54) NUCLEAR REACTOR SAFETY SYSTEM

(71) Applicant: ROLLS-ROYCE POWER ENGINEERING PLC, Derby (GB)

(72) Inventor: Benjamin J. Ireland, Derby (GB)

(73) Assignee: Rolls-Royce Power Engineering plc (GB)

( * ) Notice: Subject to any disclaimer, the term of this patent is extended or adjusted under 35 U.S.C. 154(b) by 0 days.

(21) Appl. No.: 16/185,090

(22) Filed: Nov. 9, 2018

(65) Prior Publication Data

US 2019/0172596 A1 Jun. 6, 2019

(30) Foreign Application Priority Data

Dec. 1, 2017 (GB) .................................. 1720014.8

(51) Int. Cl.
*G21C 15/18* (2006.01)
*G21D 3/06* (2006.01)
*G21C 1/09* (2006.01)
*G21C 17/035* (2006.01)

(52) U.S. Cl.
CPC .............. *G21C 15/18* (2013.01); *G21D 3/06* (2013.01); *G21C 1/09* (2013.01); *G21C 17/035* (2013.01); *Y02E 30/40* (2013.01)

(58) Field of Classification Search
CPC ........... G21C 15/18; G21C 1/086; G21D 3/06
USPC ........................................................ 376/282
See application file for complete search history.

(56) References Cited

U.S. PATENT DOCUMENTS 4,753,771 A 6/1988 Conway et al.
5,180,543 A 1/1993 Conway et al.

2012/0263268 A1 10/2012 Kwon et al.
2014/0016734 A1* 1/2014 Moon .................... G21C 15/18 376/282
2014/0226778 A1* 8/2014 Kim ....................... G21C 15/18 376/282
2015/0243384 A1 8/2015 Kwon et al.

FOREIGN PATENT DOCUMENTS

FR 2994321 A1 2/2014

OTHER PUBLICATIONS

Great Britain Search Report dated Jun. 1, 2018, issued in GB Patent Application No. 1720014.8.
European Search Report for Application No. 18203926.3-1212, dated Mar. 15, 2019, 7 pages.

* cited by examiner

*Primary Examiner* — Jack W Keith
*Assistant Examiner* — Daniel Wasil
(74) *Attorney, Agent, or Firm* — Barnes & Thornburg LLP

(57) ABSTRACT

A coolant injection system for a nuclear power generation system includes the coolant injection system, and method of operation of the coolant injection system. The nuclear power generation system includes a reactor pressure vessel having a reactor core, a pressuriser in fluid communication with the reactor pressure vessel, and the injection system, which comprises a make-up tank having a tank inlet and a tank outlet. The injection system has an operating condition, and a fault response condition, and is configured to switch between these conditions when coolant level in the pressuriser drops below a threshold level. In the operating condition, the tank outlet is isolated from the reactor pressure vessel such that coolant is retained in the make-up tank, and the tank inlet is in fluid communication with the reactor pressure vessel and the pressuriser.

12 Claims, 1 Drawing Sheet

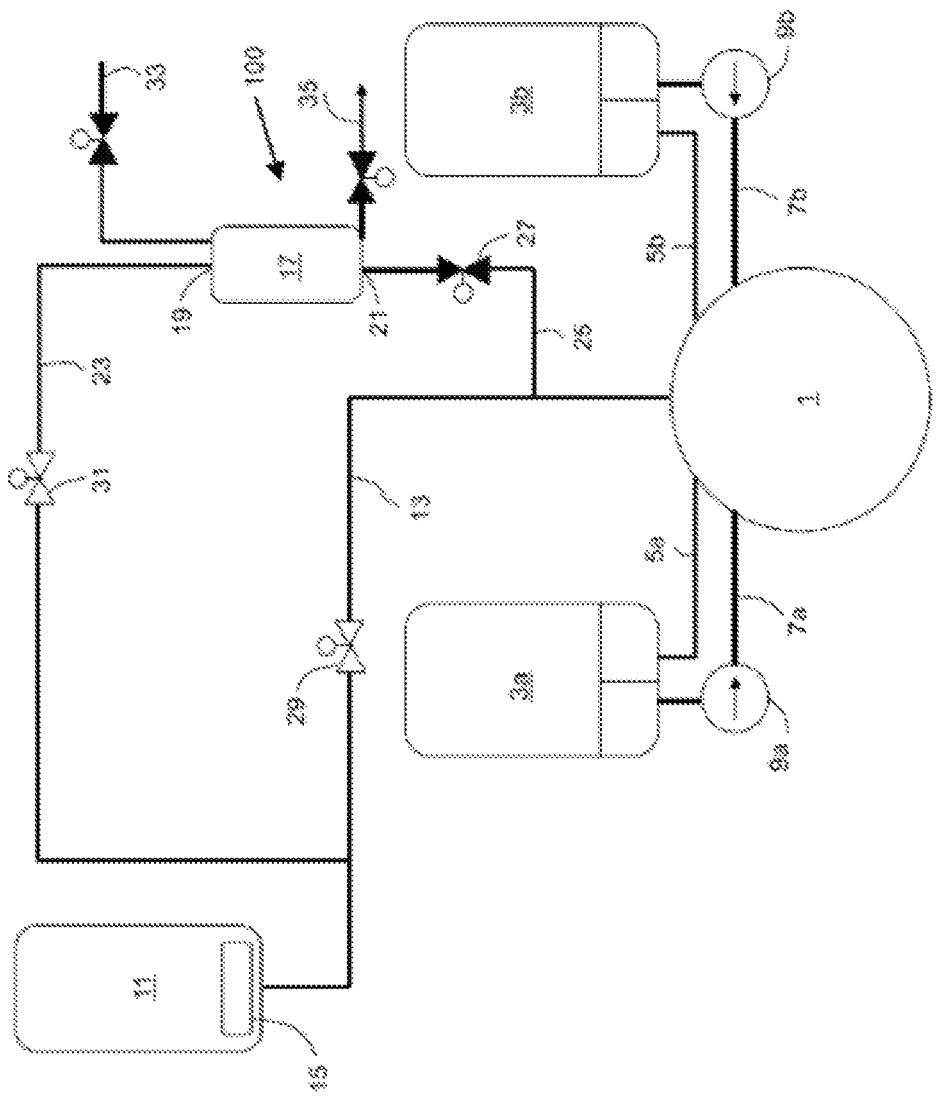

NUCLEAR REACTOR SAFETY SYSTEM

CROSS-REFERENCE TO RELATED APPLICATIONS

This application claims the benefit of priority from UK Patent Application No. GB 1720014.8, filed on 1 Dec. 2017, which is hereby incorporated herein in its entirety by reference.

BACKGROUND

Technical Field

The present invention relates to safety systems for nuclear power generation systems, and methods of using such systems. More specifically, it relates to safety systems for use in pressurised water reactors (PWRs).

Description of Related Art

Worldwide energy demands are constantly increasing, and nuclear energy is increasingly considered an attractive energy source for meeting this growing requirement, with current estimates that nuclear power provides between around 10 and 15% of the world's total energy production. Maintaining a reliable safety system that is capable of providing an effective response in various fault situations is paramount, particularly in view of the hazards posed by uncontrolled emission of radiation into the environment.

In pressurised water reactors, safety systems are typically provided to deliver protection against a number of faults, including rapid cooldown events, in which the reactor coolant rapidly cools down and contracts, and loss of coolant accidents (LOCA), in which a significant volume of coolant is lost from the system. Such fault events can lead to the reactor pressuriser emptying due to reduction in coolant volume in the system. This volume reduction results either directly from loss of coolant from the system in a LOCA, or due to thermal contraction of the coolant in the case of a rapid cooldown event. Typically, the volume reduction will be greater in a LOCA than in the case of a rapid cooldown event. When the pressuriser empties, steam from the pressuriser may enter the reactor circuit (primary circuit) and the system pressure can rapidly fall to a saturation condition. As the system pressure falls, the reactor coolant may boil off, increasing the risk of uncovering the reactor core as coolant level is suppressed in the reactor pressure vessel. Uncovering of the reactor core is highly undesirable as it reduces the ability of the system to remove excess decay heat from the core, and leads to a risk of potential fuel melt.

A commonly-employed method of resolving extreme system faults is implementation of an emergency core cooling system in which the reactor pressure vessel is rapidly depressurised through opening of emergency blowdown lines, and a large quantity of water is injected into the reactor pressure vessel by gravity drain, typically from a tank located inside or outside of the containment. However, for certain faults, such as rapid cooldown events and some LOCAs, their initiation frequency means that it is preferred to have two independent safety measures, rather than resorting to initiation of emergency core cooling systems which can be highly disruptive to plant operating conditions. Accordingly, it is desired to find methods of coolant injection into the reactor pressure vessel without the need to initiate emergency core cooling systems which require depressurisation of the system, i.e. methods of coolant injection which are able to operate under conditions where the nuclear power generation system remains at a relatively high pressure (e.g. above 5.0 MPa).

Safety systems employed in nuclear power generation systems can generally be categorised into either active or passive safety systems.

Active safety systems are typically defined as those for which external power input or forces are required, and typically have associated control and instrumentation systems. One example is the use of high-head pumps for emergency injection of coolant into the reactor pressure vessel in the case of a rapid cooldown event or LOCA. Whilst such systems can be effective, they are typically dependent on external power input, and often require complex control and instrumentation systems.

Passive safety systems are classified by the International Atomic Energy Agency into four different categories (A-D) depending on the exact nature of the passive safety system. Category A includes physical barriers against the release of radioactive material, such as nuclear fuel cladding or the nuclear power generation system containment structure. Category B includes emergency cooling systems based on air or water natural circulation in heat exchangers to which decay heat is transferred. Category C includes accumulators, which are dependent on valve actuation (i.e. moving mechanical parts), but do not require intelligent signal inputs or external power input. Category D includes SCRAM or reactor trip systems in which control rods drop under gravity upon release.

Known injection systems which are effective at higher pressures are typically active systems, for example the high head pumps discussed above. Use of active safety systems may introduce additional risk into the system, as the pumps may be more likely to fail in some types of fault event of the nuclear power generation system.

Accordingly, it is desired to find a passive safety system which is nevertheless capable of injecting coolant into the reactor pressure vessel at elevated pressures.

SUMMARY

In a first aspect, there is provided a coolant injection system for a nuclear power generation system including a reactor pressure vessel having a reactor core, and a pressuriser in fluid communication with the reactor pressure vessel, the injection system comprising a make-up tank having a tank inlet and a tank outlet, wherein the injection system is configured to switch between an operating condition and a fault response condition when the coolant level in the pressuriser drops below a threshold level, and wherein:

in the operating condition, the tank outlet is isolated from the reactor pressure vessel such that coolant is retained in the make-up tank, and the tank inlet is in fluid communication with the reactor pressure vessel and the pressuriser; and in the fault response condition, the tank inlet is isolated from the reactor pressure vessel, and the tank outlet is in fluid communication with the reactor pressure vessel such that coolant from the make-up tank can flow into the reactor pressure vessel to provide cooling of the reactor core.

Operating condition is used here to refer to a 'normal' condition of the injection system. Typically, the injection system will run in the operating condition unless and until a fault event (in which coolant level in the pressuriser drops below a threshold level) in the nuclear power generation system is detected. When such a fault is detected, the injection system is configured to switch to the fault response condition in which water is injected into the reactor pressure vessel. In this way, activation of the fault response condition may reduce the risk of uncovering of the reactor core as a result of a fault event in the nuclear power generation system.

Provision of such an injection system can enable a compact and efficient core cooling system for response to a number of fault events of the nuclear power generation system. By isolation of the make-up tank inlet from the reactor pressure vessel (RPV) in the fault response condition, backflow of hot coolant from the RPV into the make-up tank is prevented. Accordingly, the make-up tank can be significantly reduced in size in comparison to known systems, because the tank does not need to have the large capacity that has been necessary in previous system to hold the required mass of (relatively low density) hot coolant from the RPV. Rather, because the make-up tank is an independent cold-temperature system, the capacity can be smaller for the same mass of injected coolant. Accordingly, manufacture of the tank can be less expensive, and the overall space required for the system is reduced.

The system may be configured such that in the fault condition, the tank inlet is in fluid communication with the pressuriser. Accordingly, the coolant injection may be driven by residual pressure in the pressuriser. By driving the coolant into the RPV using pressure from the pressuriser, the injection system may be able to operate under conditions where the nuclear power generation system remains at a relatively high pressure (e.g. above 5.0 MPa).

The injection system may be classified as a passive system. Accordingly, in one embodiment, the injection system does not employ pumps for the injection of coolant into the reactor pressure vessel. As such, the system may offer improved safety in response to some fault events of the nuclear power generation system due to a lower risk of failure as compared to active systems, whilst not requiring total system depressurisation.

In a second aspect, there is provided a method of operation of a coolant injection system for a nuclear power generation system including a reactor pressure vessel having a reactor core, a pressuriser in fluid communication with the reactor pressure vessel, and a coolant injection system comprising a make-up tank having a tank inlet and a tank outlet, the method including the steps of:

detecting a coolant level in the pressuriser;

in an operating condition in which the coolant level in the pressuriser is above a threshold level, isolating the tank outlet from the reactor pressure vessel such that coolant is retained in the make-up tank, and the tank inlet is in fluid communication with the reactor pressure vessel and the pressuriser;

when the coolant level in the pressuriser drops below the threshold level, switching the injection system from the operating condition to a fault response condition, in which the tank inlet is isolated from the reactor pressure vessel, and the tank outlet is in fluid communication with the reactor pressure vessel; and allowing coolant from the make-up tank to flow into the reactor pressure vessel to provide cooling of the reactor core.

In a third aspect, there is provided a nuclear power generation system comprising the coolant injection system of the first aspect.

Optional features will now be set out. These are applicable singly or in any combination with any aspect.

The tank inlet may be located in a top wall of the make-up tank. In the operating condition, the tank inlet provides a fluid connection between the make-up water tank and the pressuriser. The tank inlet may be arranged such that during normal operation of the system, coolant does not flow into the make-up tank through the tank inlet.

Correspondingly, the tank outlet may be located in a bottom wall of the make-up tank. When the injection system is in the fault response condition, coolant contained in the make-up tank will flow out of the tank via the tank outlet.

Fluid connection between the pressuriser and the RPV may be provided via a surge line connecting the pressuriser and the RPV in a known manner.

Fluid connection between the make-up tank inlet and the pressuriser may be provided via a pressure balance line. By providing a pressure balance line, the make-up tank can be maintained at system pressure during normal operation of the nuclear power generation system. The pressure balance line may be formed by rising pipework connected to the surge line. Alternatively the pressure balance line may connect directly to the pressuriser.

Fluid connection between the make-up tank outlet and the RPV may be provided via an outlet line connected to the make-up tank outlet. The outlet line may connect the make-up tank to the surge line, or may alternatively connect directly to the RPV, or to a hot leg of the primary circuit.

There may be an auxiliary circuit branching from the primary circuit at first and second connection points. The pressure balance line, make-up tank and outlet lines may form all or part of such an auxiliary circuit. The first and second connection points may both be on the surge line. Where the pressure balance and outlet lines form part of an auxiliary circuit having both first and second connection points on the surge line, the connection of the pressure balance line to the surge line will typically be closer to the pressuriser than the connection of the outlet line to the surge line.

The coolant injection system may comprise a valve arrangement operable in response to the coolant level in the pressuriser to switch the injection system between the operating condition and the fault response condition. Such valve arrangement may comprise one or more valves. For example, the valve arrangement may comprise a first valve located on the outlet line (hereafter referred to as an 'outlet valve'), and a second valve located on the surge line (hereafter referred to as a 'surge line valve'.

Other valve arrangements are also contemplated. For example, the valve arrangement may comprise a single multi-way (e.g. three-way) valve, rather than separate first and second valves. The valve arrangement may be actuated in any suitable manner. For example, the valve arrangement may be operable in response to e.g. a control signal initiated by a detector in response to coolant level in the pressuriser falling below a threshold level. Actuation of the valve arrangement may be automatic in response to detection of a specified fault event in the nuclear power generation system.

Where the valve arrangement comprises outlet and surge line valves as described above, actuating the valve arrangement may include the steps of opening the outlet valve, and closing the surge line valve. The outlet and surge line valves may be actuated simultaneously. Alternatively, the outlet and surge line valves may be actuated at different times. For example, the surge line valve may be closed before the outlet valve is opened, to ensure that there is no backflow of coolant liquid into the make-up tank upon opening of the outlet valve.

As is known from typical pressurised water reactors, the pressuriser may contain one or more heaters to assist in control of pressure in the pressuriser. Accordingly, the threshold coolant level may be selected to be a level at which one or more of the heaters is/are at least partially uncovered. Alternatively, a margin may be provided such that the threshold level is selected to be above that at which the heaters would be uncovered. The precise level which is selected as the threshold level is not specifically limited. Selecting the threshold level to be higher will result in more rapid actuation of the injection system when a fault event occurs, but may also result in a greater risk of the injection system actuating unnecessarily due to normal temperature fluctuation of the system. Accordingly, the threshold level should be selected as appropriate by balancing the desired response time against the risk of unnecessary actuation.

The make-up tank may be positioned vertically above the reactor vessel. It may be positioned either directly above the reactor vessel, or may instead be laterally offset from the reactor vessel. The precise arrangement of the make-up tank in relation to other components of the nuclear power generation system will generally depend in part on other constraints such as available space within the containment. Because the flow of coolant may be driven by residual pressure in the pressuriser, the exact positioning (vertical and lateral) of the makeup tank in relation to the RPV is not particularly limited.

The volume of coolant injected from the make-up tank in the fault response condition may vary depending on the coolant volume reduction in the primary circuit. Accordingly, the size of the make-up tank may be selected such that the level of coolant in the make-up tank remains above a threshold level when the coolant volume reduction is due to a rapid cooldown fault event (which results in a maximum known volume reduction based on thermal contraction of the total volume of coolant in the circuit), and only drops below this threshold level in the case of a LOCA. In this way, the level of coolant in the make-up tank can itself be used as a trigger for additional safety systems which require initiation in response to more serious fault events. For example, there may be a detector located in the make-up tank and arranged to detect the level of coolant in the tank such that when the level of water in the make-up water tank drops below the selected threshold level, emergency blow down (EBD), or some other specified safety system or procedure initiates. This threshold level may be a level at which the make-up tank is completely empty, or may be at some selected level higher than this. When selecting the threshold level of the make-up tank, similar considerations apply as discussed above in relation to selection of the threshold level in the pressuriser.

The injection system may be arranged to allow for total isolation of the pressuriser from the make-up tank and reactor pressure vessel under selected conditions. Typically, in a fault response condition of the injection system, the pressuriser will remain in fluid communication with the reactor pressure vessel via the make-up tank to assist in coolant injection under residual pressure from the pressuriser. However, where a fault event in the nuclear power generation system is caused by a leak from the pressuriser, maintaining such fluid connection may not be desirable. Accordingly, there may be provided an isolation valve operable to isolate the make-up tank inlet from the pressuriser in selected conditions, such as when a pressuriser leak is detected. The isolation valve may be provided on the pressure balance line connecting the make-up tank and the pressuriser. Where present, the isolation valve will typically remain open during normal operation of the nuclear power generation system, and be actuated to close when it is detected that the fault event in the nuclear power generation system is a pressuriser leak. In other words, the isolation valve may prevent fluid communication between the tank inlet and the pressuriser in the fault response condition.

The make-up tank may further comprise a gas inlet line arranged to supply gas to the make-up tank. In this way, where the injection system is arranged to provide total isolation of the pressuriser from the make-up tank and the reactor pressure vessel, pressure may still be maintained in the primary circuit of the nuclear power generation system by injection of gas into the make-up tank whilst the injection system is in a fault response condition (i.e. the tank outlet is in fluid communication with the RPV), and when the pressuriser is isolated.

The make-up tank may have a drain line.

The make-up tank may be arranged to supply any suitable coolant fluid, however the coolant will typically comprise water, as a cost-effective coolant. The make-up tank may be arranged to supply boronated water. In this way, injection of water into the RPV can also provide a method of emergency boron injection directly into the RPV when the nuclear power generation system undergoes a fault event. Direct injection of boron can help to absorb excess neutrons in the RPV and according decrease the risk of nuclear runaway in the reactor core.

DESCRIPTION OF THE DRAWINGS

Embodiments will now be described by way of example with reference to the accompanying drawing in which:

FIG. 1 shows a schematic process flow arrangement of a primary circuit of a nuclear power generation system incorporating a passive injection system.

DETAILED DESCRIPTION

FIG. 1 shows a schematic process flow arrangement of a primary circuit (also referred to as the reactor coolant circuit) of a nuclear power generation system (not shown) incorporating a passive injection system 100. The nuclear power generation system is a pressurised water reactor (PWR) including in the primary circuit a reactor pressure vessel 1 containing a reactor core for generation of heat by radioactive decay. The reactor core heats a coolant fluid (typically water) contained in the primary circuit. The reactor pressure vessel is connected to first and second steam generators 3a, 3b, via respective hot legs 5a, 5b and cold legs 7a, 7b, and there are respective primary pumps 9a, 9b arranged to provide active flow of coolant fluid from the reactor pressure vessel 1, through the hot legs 5a, 5b, to the first and second steam generators 3a, 3b, where heat is transferred to respective secondary circuits (not shown) in a well-known manner, before being returned to the reactor pressure vessel via cold legs 7a, 7b respectively.

The reactor pressure vessel 1 is connected to a pressuriser 11 via surge line 13, and in normal operation acts to maintain the primary circuit at a suitable pressure. The pressuriser contains one or more heaters 15, and one or more detectors (not shown) for detecting the water level and pressure in the pressuriser. When the pressure in the circuit drops below a threshold level, the heaters can be activated to heat water held in the pressuriser. This causes water in the pressuriser to boil, creating steam and thus increasing pressure in the system to maintain the system at the required pressure.

The passive injection system 100 comprises a make-up water tank 17 having a tank inlet 19 and tank outlet 21. Here, the tank inlet and tank outlet are conveniently located in top and bottom walls of the tank respectively. In normal operation, the make-up water tank contains a supply of boronated water. Here, the passive injection system forms part of an auxiliary circuit branching from the surge line 13 at first and second connection points. The auxiliary circuit includes rising pipe-work which forms a pressure balance line 23 connecting the tank inlet to the pressuriser. Accordingly, in normal operation, the make-up water tank will be maintained at system pressure due to this fluid connection with the pressuriser. The auxiliary circuit further includes an outlet line 25 connecting the tank outlet to the surge line at a point downstream of the connection of the surge line to the pressure balance line 23 relative to the pressuriser. This outlet line forms an injection conduit for injection of water into the reactor pressure vessel from the make-up water tank, in a manner that will be described later.

There is a valve arrangement operable to switch the injection system between an operating condition, in which the tank outlet is isolated from the reactor pressure vessel, such that water is retained in the make-up water tank 17, and the tank inlet 19 is in fluid communication with the reactor pressure vessel 1 and the pressuriser 11 and a fault response condition, in which the tank inlet 19 is in fluid communication with the pressuriser 11 and isolated from the reactor pressure vessel 1, and the tank outlet 21 is in fluid communication with the reactor pressure vessel 1. In the fault condition, water is driven from the make-up tank 17 into the RPV 1 by residual pressure from the pressuriser 11. Here, the valve arrangement is provided as two separate valves, a first valve 27 disposed between the make-up water tank 17 and the reactor pressure vessel 1 on the outlet line 25 (the 'outlet line valve'), and the second valve 29 disposed between the reactor pressure vessel and the pressuriser on the surge line (the 'surge line valve'). In normal operation of the nuclear power generation system, when the injection system is in an operating condition, the surge line valve 29 is open, to allow equalisation of pressure between the pressuriser 11 and the reactor pressure vessel 1 in a manner described previously, and the outlet valve 27 is shut, to retain water in the make-up water tank 17. However, when the water level in the pressuriser 11 falls below a threshold level due to e.g. a fault event in the nuclear power generation system which results in a decrease in coolant volume, the valve arrangement is actuated to open the outlet valve 27 and close the surge line valve 29. In this way, the surge line 13 is isolated, and water held in the make-up tank 17 is able to flow into the reactor pressure vessel 1, driven by the residual pressure in the pressuriser 11, whilst backflow of water from the RPV into the make-up tank is prevented. This provides cooling of the reactor core by increasing coolant mass and providing additional boron directly to the RPV.

The make-up water tank 17 is sized such that during a cooldown/contraction fault event, the tank does not empty due to the total volume of coolant remaining in the system. However, in a LOCA, where total volume losses are typically greater than for cooldown events, the tank may empty. A detector (not shown) in the make-up tank is arranged to detect the level of water in the tank, such that when the level of water in the make-up water tank drops below a threshold level, EBD initiates.

The system includes an isolation valve 31 located on the pressure balance line. In normal operation, this valve is open, but it can be controlled to close when e.g. it is detected that there is a leak from the pressuriser such that isolation of the pressuriser from the make-up water tank is advantageous. When such situation is detected (e.g. by monitoring of pressuriser level with the surge line isolated), the isolation valve is closed. As loss of coolant from the pressuriser will also result in isolation of the surge line due to the passive injection system switching to the fault response condition as the water level drops below a threshold level, the pressuriser will accordingly be isolated from both the make-up water tank and the RPV. If necessary, gas can then be supplied through gas line 33 into the make-up water tank to maintain pressure control of the nuclear power generation system by provision of a pressurised gas bubble in the make-up water tank.

A drain line 35 is located in the bottom of the make-up tank.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A nuclear power generation system comprising:
    a reactor pressure vessel having a reactor core;
    a pressuriser in fluid communication with the reactor pressure vessel; and
    a cooling injection system including a make-up tank having a tank inlet and a tank outlet, the injection system configured to switch between an operating condition and a fault response condition when the coolant level in the pressuriser drops below a threshold level,
    wherein:
        in the operating condition, the tank outlet is isolated from the reactor pressure vessel such that coolant is retained in the make-up tank, and the tank inlet is in fluid communication with the reactor pressure vessel and the pressuriser; and
        in the fault response condition, the tank inlet is isolated from the reactor pressure vessel, the tank outlet is in fluid communication with the reactor pressure vessel such that coolant from the make-up tank can flow into the reactor pressure vessel to provide cooling of the reactor core, and the tank inlet is in fluid communication with the pressuriser such that residual pressure in the pressuriser can drive coolant from the make-up tank into the reactor pressure vessel.

2. The coolant injection system according to claim 1, wherein the makeup tank is arranged to supply boronated water.

3. The coolant injection system according to claim 1, comprising a valve arrangement operable in response to the coolant level in the pressuriser to switch the injection system between the operating condition and the fault response condition.

4. The coolant injection system according to claim 3, wherein the valve arrangement comprises a first valve located intermediate the tank outlet and the reactor pressure vessel, and a second valve located intermediate the reactor pressure vessel and the pressuriser.

5. The coolant injection system according to claim 1, wherein the make-up tank inlet is connected to the pressuriser via a pressure balance line for maintenance of the make-up tank at system pressure.

6. The coolant injection system according to claim 5, wherein the pressuriser is connected to the reactor vessel via a surge line.

7. The coolant injection system according to claim 6, wherein the pressure balance line and make-up tank form part of an auxiliary circuit branching from the surge line.

8. The coolant injection system according to claim 7, wherein the auxiliary circuit further comprises an outlet line which connects the make-up tank outlet to the surge line.

9. The coolant injection system according to claim 1, wherein the pressuriser contains one or more heaters, and the threshold level is a level at which the heater(s) are at least partially uncovered.

10. The coolant injection system according to claim 1, wherein the make-up tank is positioned vertically above the reactor vessel.

11. The coolant injection system according to claim 1, further comprising an isolation valve for isolating the pressuriser from the make-up tank inlet.

12. The coolant injection system according to claim 11, further comprising a gas inlet line arranged to supply gas to the make-up tank to maintain pressure in the nuclear power generation system when the pressure balance line isolation valve is closed.

* * * * *